(12) United States Patent
Murata et al.

(10) Patent No.: US 7,380,989 B2
(45) Date of Patent: Jun. 3, 2008

(54) FLUID DYNAMIC PRESSURE BEARING AND RECORDING DISK DRIVE DEVICE COMPRISING THE SAME

(75) Inventors: Itsuo Murata, Kyoto (JP); Harushige Osawa, Kyoto (JP); Ming Feng, Kyoto (JP); Shinya Tokunaga, Fujiidera (JP)

(73) Assignee: Nidec Corporation, Kyoto (JP)

( * ) Notice: Subject to any disclaimer, the term of this patent is extended or adjusted under 35 U.S.C. 154(b) by 135 days.

(21) Appl. No.: 10/908,113

(22) Filed: Apr. 28, 2005

(65) Prior Publication Data

US 2005/0244086 A1 Nov. 3, 2005

(30) Foreign Application Priority Data

Apr. 28, 2004 (JP) ............................. 2004-134781

(51) Int. Cl.
*F16C 33/02* (2006.01)
*F16C 33/06* (2006.01)
(52) U.S. Cl. .................... 384/118; 384/114; 384/279
(58) Field of Classification Search .............. 384/111, 384/118, 115, 107, 114
See application file for complete search history.

(56) References Cited

U.S. PATENT DOCUMENTS 4,747,705 A * 5/1988 Agrawal .................... 384/118
6,244,749 B1 * 6/2001 Nakagawa et al. ......... 384/114
6,805,489 B2   10/2004 Nakagawa et al.

FOREIGN PATENT DOCUMENTS

| JP | H08-321131 A | 12/1996 |
|----|--------------|---------|
| JP | 2905386 B2   | 3/1999  |
| JP | 2000-192945 A | 7/2000 |
| JP | 2004-056963 A | 2/2004  |
| JP | 3 620 815 B2 | 11/2004 |

* cited by examiner

*Primary Examiner*—Marcus Charles
(74) *Attorney, Agent, or Firm*—Volentine & Whitt, PLLC

(57) ABSTRACT

In a radial minute gap between a substantially columnar shaft and an inner peripheral face of a substantially cylindrical sleeve, oil is retained and a radial dynamic pressure bearing is formed. A plurality of recessed portions are arranged in a circumferential direction on at least one of an outer peripheral face of the shaft and the inner peripheral face of the sleeve and a first hill portion is provided to an axial end portion of each the recessed portion. Thus, it is possible to achieve a dynamic pressure bearing with which sufficient radial shaft support can be obtained in spite of a short axial length.

17 Claims, 11 Drawing Sheets

FLUID DYNAMIC PRESSURE BEARING AND RECORDING DISK DRIVE DEVICE COMPRISING THE SAME

BACKGROUND OF THE INVENTION

1. Field of the Invention

The present invention relates to a small and thin dynamic pressure bearing, a spindle motor formed by using the dynamic pressure bearing, and a recording disk drive device formed by using the spindle motor.

2. Background Art

Efforts are being made to miniaturize recording disk drive devices, such as hard disk drives, for use in computer equipment, home audiovisual equipment and portable equipment. As such, it has become necessary to reduce the size and thickness of the spindle motor used to rotate the recording disk within the disk drive device.

In the spindle motor for rotating the recording disk, a fluid dynamic pressure bearing is used to meet demands for quietness and long life. In order to support radial loads, substantially V-shaped herringbone grooves are formed in general. By arranging herringbone grooves in two rows in an axial direction, moment stiffness is obtained. However, if the motor is made thin and a radial length of the radial dynamic pressure bearing is reduced, it is difficult to arrange the herringbone grooves in a plurality of rows in the radial direction because of working constraints. However, with a row of grooves, the moment stiffness is insufficient and it is difficult to support the shaft stably.

On the other hand, so-called stepped grooves are employed widely, in which a bearing pitch of the radial bearing is varied in a circumferential direction to thereby support the shaft. With the stepped groove, however, the dynamic pressure is increased in a wide range in an axial direction and therefore sufficient moment stiffness cannot be obtained. For sufficient stiffness, rotational resistance due to generation of dynamic pressure increases and power consumption also increases.

It is an object of the present invention to provide the dynamic pressure bearing with which sufficient radial support of the shaft can be obtained in spite of a short axial length.

BRIEF SUMMARY OF THE INVENTION

In view of the above problems to be solved by the present invention, a dynamic pressure bearing according to a first invention of the present invention comprises a substantially columnar shaft and a substantially cylindrical sleeve. An outer peripheral face of the shaft and an inner peripheral face of the sleeve face each other through a minute gap in a radial direction. Dynamic pressure generating fluid is retained in the radial minute gap. The outer peripheral face of the shaft, the inner peripheral face of the sleeve, and the dynamic pressure generating fluid retained in the radial minute gap form a radial dynamic pressure bearing. A plurality of recessed portions are arranged in a circumferential direction on at least one of the outer peripheral face of the shaft and the inner peripheral face of the sleeve. Radially projecting a first hill portion is formed at an axial end portion of the recessed portion.

When the shaft and the sleeve of the invention rotate with respect to each other, dynamic pressure for supporting a radial load is generated. Generated dynamic pressure can properly be regulated by designing an axial width where the dynamic pressure is to be increased. In this case, one or plurality of portions with high dynamic pressure can be provided in the axial direction and the dynamic pressure can be increased through a certain width.

The first hill portion formed at the axial end portion of the recessed portion functions as a so-called flow barrier of the dynamic pressure generating fluid and for preventing the dynamic pressure generating fluid dynamic pressure of which has been increased from escaping outward from the axial end portion. At the first hill portion, a gap between the shaft and the sleeve is narrowed in the circumferential direction. Therefore, it is possible to increase pressure of the dynamic pressure generating fluid in such a direction as to prevent inclination when the shaft is inclined in any direction. Thus, the shaft can be supported efficiently in spite of a short axial length of the dynamic pressure bearing.

The first hill portion may smoothly be contiguous with the recessed portion. It is also possible that the hill portion is formed with a step and the step may be a wall face.

Furthermore, a dynamic pressure bearing according to a second invention of the present invention includes a substantially columnar shaft and a substantially cylindrical sleeve. At at least one of axial end portions of the sleeve, a sleeve end face formed of a face orthogonal to the shaft is formed. A thrust flange extends radially outward from the shaft. A thrust face opposed to the sleeve end face is formed on the thrust flange.

An outer peripheral face of the shaft and an inner peripheral face of the sleeve face each other through a minute gap in the radial direction. The sleeve end face and the thrust face face each other through a minute gap in the axial direction. Dynamic pressure generating fluid is retained contiguously in the radial minute gap and an axial gap.

A plurality of recessed portions are arranged in a circumferential direction on at least one of the outer peripheral face of the shaft and the inner peripheral face of the sleeve. A portion of at least one of the sleeve end face and the thrust face forming the axial gap has an axial hill portion formed throughout a circumference along a circumferential direction. With the axial hill portion, the axial gap between the sleeve end face and the thrust face is narrowed throughout the circumference in the circumferential direction.

By contiguous retaining of the dynamic pressure generating fluid in the axial gap contiguous with the radial dynamic pressure bearing, it is possible to prevent dissolving of gas and occurrence of air bubbles in the radial dynamic pressure bearing. As a result, shaft supporting pressure is stable for a long term.

Because the axial hill portion is formed, a portion of the axial gap is narrowed throughout the circumference and the axial hill portion functions as the flow barrier of the dynamic pressure generating fluid. Thus, it is possible to prevent the dynamic pressure generating fluid dynamic pressure of which has been increased by the radial dynamic pressure bearing from escaping outward from the axial end portion.

The axial gap between the thrust face and the sleeve end face may be narrowed and the faces and the dynamic pressure generating fluid retained between them may form a thrust dynamic pressure bearing.

If the thrust dynamic pressure bearing is formed, the shaft is supported in cooperation with the radial dynamic pressure bearing, it is possible to easily enhance the shaft supporting force.

A dynamic pressure bearing according to a third invention of the present invention includes a substantially columnar shaft and a substantially cylindrical sleeve. At at least one of axial end portions of the sleeve, a sleeve end face formed of a face orthogonal to the shaft is formed. A thrust flange extends radially outward from the shaft. At the thrust flange, a thrust face opposed to the sleeve end face is formed.

An outer peripheral face of the shaft and an inner peripheral face of the sleeve face each other through a minute gap in the radial direction. Dynamic pressure generating fluid is retained in the radial minute gap and a radial dynamic pressure bearing is formed. The sleeve end face and the thrust face face each other through a minute gap in the axial direction. Dynamic pressure generating fluid is retained in the axial minute gap and a thrust dynamic pressure bearing is formed. The dynamic pressure generating fluid is contiguously retained in the radial minute gap and the axial minute gap.

A plurality of recessed portions are arranged in a circumferential direction on at least one of the outer peripheral face of the shaft and the inner peripheral face of the sleeve forming the radial dynamic pressure bearing.

Dynamic pressure generating grooves are formed on one or both of the thrust face and the sleeve end face forming the thrust dynamic pressure bearing. The dynamic pressure groove has a shape including a spiral portion for delivering the dynamic pressure generating fluid radially inward in rotation of the shaft and the sleeve with respect to each other. The thrust dynamic pressure bearing is a pump-in thrust dynamic pressure bearing for increasing pressure of the dynamic pressure generating fluid radially inward with the dynamic pressure generating grooves.

The pump-in thrust dynamic pressure bearing increases dynamic pressure of the dynamic pressure generating fluid inward in the radial direction of the axial gap. The portion where the dynamic pressure has been increased functions as a flow barrier of the dynamic pressure generating fluid. In this manner, it is possible to prevent the dynamic pressure generating fluid dynamic pressure of which has been increased by the radial dynamic pressure bearing from escaping radially outward. Moreover, with the pump-in thrust dynamic pressure bearing, an inside of the dynamic pressure bearing is less liable to become negative pressure lower than atmospheric pressure. As a result, stable shaft supporting force can be obtained.

In the dynamic pressure bearing of the first invention, an end of the shaft may be formed into a spherical shape or a spindle shape and a thrust piece may be directly or indirectly fixed to the sleeve. In this case, an axial load is supported by sliding of the thrust piece and a point of a tip end portion of the one end side on which the shaft is formed into the spherical or spindle shape on each other.

In the dynamic pressure bearing according to the second and third inventions of the present invention, a diameter of the sleeve end face forming the thrust dynamic pressure bearing may be equal to or greater than an axial length of the inner peripheral face of the sleeve forming the radial dynamic pressure bearing. With such a bearing, a motor including the dynamic pressure bearing can be made thinner.

In the dynamic pressure bearing of the invention, it is preferable that the recessed portion is formed with a tapered face. The tapered face has such a shape that a depth of the recessed portion reduces from a deepest portion of the recessed portion toward a shallowest portion of the recessed portion formed on one side in the circumferential direction.

As a result, the radial dynamic pressure is increased from the deepest portion of the recessed portion toward the shallowest portion of the recessed portion. If a plurality of sets of recessed portion and tapered face are formed in the circumferential direction, the dynamic pressure can be increased stably.

It is preferable that at least three or more recessed portions having tapered faces are formed on any one of the shaft outer peripheral face and the sleeve inner peripheral face.

In the dynamic pressure bearing of the invention, a second hill portion projecting from axial opposite ends may be formed at a portion of the tapered face in the recessed portion. This second hill portion obstructs a flow path of the dynamic pressure generating fluid on the tapered face. With this second hill portion, dynamic pressure adjacent to the hill portion is increased.

It is more desirable that the second hill portion is formed on the shallower side of a center between the deepest portion and the shallowest portion of the recessed portion. In this manner, the dynamic pressure can be further increased especially in the shallower portion of the recessed portion where the dynamic pressure is increased.

Moreover, in the dynamic pressure bearing of the invention, the second hill portion may be positioned at the vicinity of the axial center of the recessed portion and the shallower portion of the recessed portion in the tapered portion may be divided in the axial direction. Thus, the shallower portion of the recessed portion in the tapered portion is divided in the axial direction. As a result, the radial dynamic pressure is increased in two or more places in the axial direction and the shaft support can be stabilized.

The shallower portion of the recessed portion of the divided tapered portion is preferably in such a shape that an axial length reduces as the depth of the recessed portion decreases.

In the dynamic pressure bearing of the invention, a recessed groove deeper than the recessed portion may be formed at at least one portion of the axial center portion of the recessed portion. With this recessed groove, shaft supporting pressure is reduced in the axial center portion by the recessed groove and the shaft supporting pressure is increased virtually at two positions in the axial direction.

The recessed groove may be formed seamlessly in the circumferential direction. In this way, it is possible to prevent excessive increase in the dynamic pressure and increase in resistance to rotation. Moreover, it is possible to circulate the dynamic pressure generating fluid in the circumferential direction.

Furthermore, the dynamic pressure bearing of the invention shows a better characteristic if a groove parallel to the axial direction is formed to be adjacent to the deepest portion of the recessed portion.

With this groove, an inside and an outside of the radial dynamic pressure bearing are connected and the groove functions as a reservoir for supplying the dynamic pressure generating fluid to the radial dynamic pressure bearing. Moreover, this groove parallel to the axial direction prevents pressure of the dynamic pressure generating fluid from becoming negative pressure in the radial dynamic pressure bearing.

The sleeve used for the invention is preferably made of sintered porous metal. The sintered porous metal is suitable for forming of the sleeve of the invention in respects of a sliding property, a wearing property, productivity, and workability. Moreover, because a lubricating fluid is retained in vacancies, the sintered porous metal is also suitable for increasing a life of the bearing. The sleeve may also be made of metals such as stainless steel, brass, aluminum, and resin.

The dynamic pressure bearing of the invention is preferably used in a spindle motor mounted in a recording disk drive device. The spindle motor includes a base plate, a stator fixed to the base plate, a rotor magnet opposed to the stator and rotatable with respect to the stator, and a rotor hub for retaining the rotor magnet. The rotor hub is supported to be rotatable with respect to the base plate by the dynamic pressure bearing of the invention. The disk drive device includes a head for reading and writing data from and on a recording disk, an actuator for moving the head on a disk face, and the above-described spindle motor in a housing.

Because the dynamic pressure bearing being a part of the spindle motor of the recording disk drive device of the invention is miniaturized and made thin, the device can be made thin and miniaturized. Moreover, even if the recording disk drive device is made thin, the bearing is stable and the shaft supporting force does not reduce. Therefore, the device is resistant to shock and vibration and it is possible to insure stable reading and writing of data.

DETAILED DESCRIPTION OF THE INVENTION

An explanation of modes of embodying the present invention will be described by reference to the drawings. All expressions related to directions, e.g., upper, lower, left, and right in the description of the embodiments denote directions relative to the images presented in the figures unless otherwise specified. Therefore, these expressions do not limit the directional orientation of actual embodiments.

First Embodiment

Figure 1:
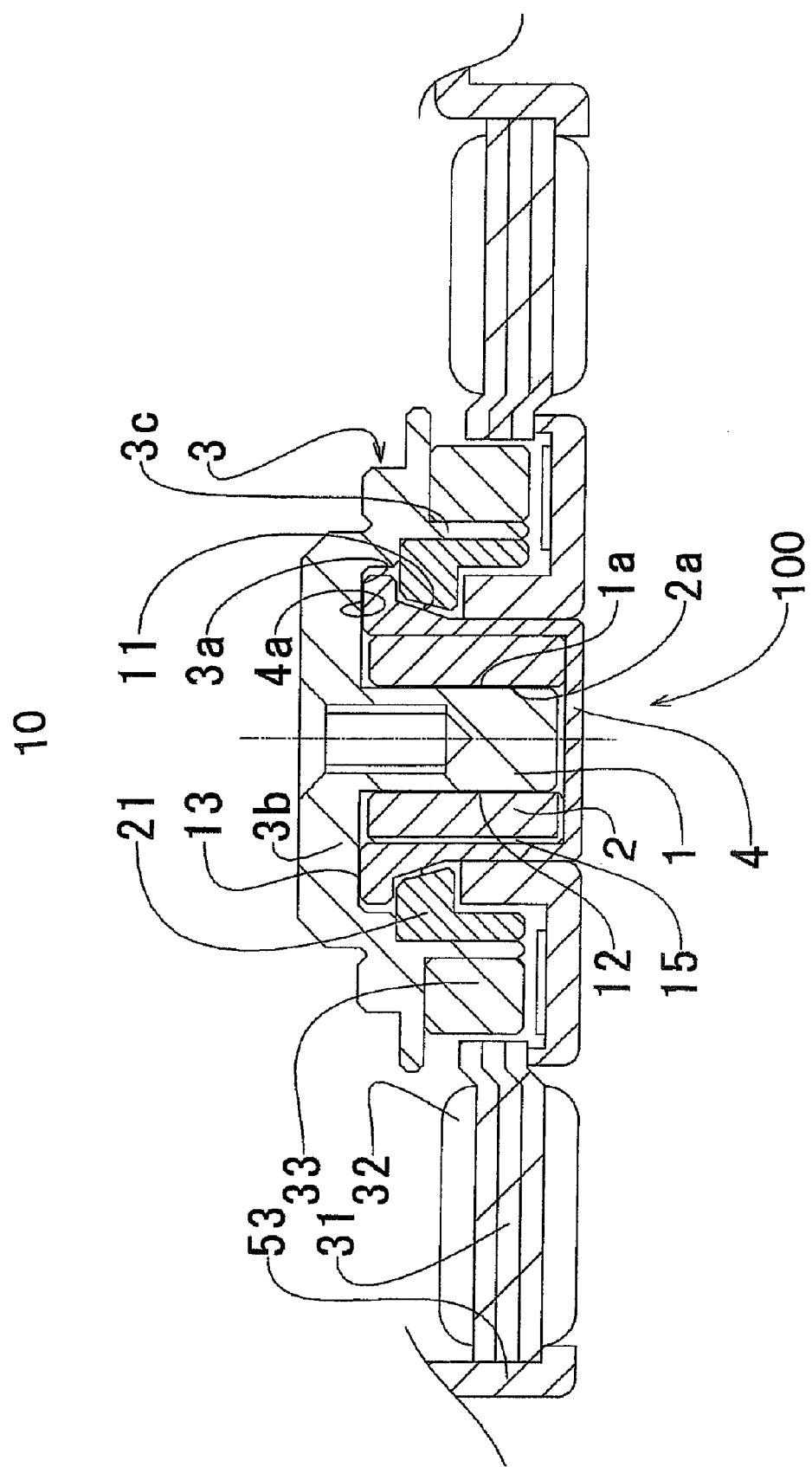
FIG. 1 is a sectional view of a dynamic pressure bearing in a first embodiment.

FIG. 1 is a sectional view of a dynamic pressure bearing 100 according to a first embodiment of the invention utilized in a spindle motor 10. Although the dynamic pressure bearing 10 of the present embodiment is used in the spindle motor, description of a structure of a rotary drive portion will be omitted. For this rotary drive portion, a structure of a conventionally-used DC motor can be employed.

(1-1) Structure

The dynamic pressure bearing 100 is formed of a substantially columnar shaft 1, a substantially cylindrical sleeve 2, a substantially cup-shaped bearing housing 4 positioned radially outside the sleeve 2 and covering the sleeve 2, and a rotor hub 3 having a top portion 3b radially extending from an upper end portion of the shaft 1. The sleeve 2 is formed of a sintered porous metal. The bearing housing 4 is made of aluminum, stainless steel, brass, resin, and the like. The shaft 1 is integrally formed with or attached to the rotor hub 3. Also represented in FIG. 1 is a housing 53, a stator 31, coils 32 and a rotor magnetic 33, each of which will be described later in connection with FIG. 9.

The sleeve 2 and the bearing housing 4 may be formed integrally. For example, they may be formed integrally of metal such as aluminum, stainless steel, and brass, or formed integrally of a sintered porous body and subjected to sealing on their outer peripheral faces and bottom faces. It is also possible for the sleeve 2 formed with sintered porous metal to be insert-molded with resin.

(1-2) Structure of Dynamic Pressure Bearing

An outer peripheral face 1a of the shaft 1 and an inner peripheral face 2a of the sleeve 2 face each other in a radial direction through a minute gap. In the radial minute gap, oil as dynamic pressure generating fluid having lubricity is retained. An upper end face of the sleeve 2 and an upper end face 4a of the bearing housing 4 face a lower face 3a of the top portion 3b of the rotor hub 3 through a minute gap in an axial direction. In the axial minute gap, the same oil that is retained in the radial minute gap is retained while communicating with the radial minute gap. Oil is also retained contiguously between a lower end portion of the shaft 1 and the bottom face of the bearing housing 4. Thus, oil is filled in the bearing housing 4 without voids.

The rotor hub 3 has a cylindrical peripheral wall 3c outside the outmost peripheral edge of the bearing housing 4 and an oil-air interface 11 is formed between an inner peripheral face of a fusion 21 attached to the cylindrical peripheral wall 3c and an outer peripheral face of the bearing housing 4. A space between the inner peripheral face of the fusion 21 and the outer peripheral face of the bearing housing 4 is tapered with a width increasing toward the outside of the bearing so as to prevent oil from leaking outside the bearing. The outer peripheral face of the bearing housing 4 is provided with a step in a circumferential direction and the fusion 21 provided to a pendent peripheral wall 3c of the rotor hub 3 faces the step to thereby prevent the shaft 1 and the sleeve 2 from moving more than a certain distance in the axial direction. Also, as shown in FIG. 1, a connecting hole 15 is formed between the bearing housing 4 and the sleeve 2 and the inner periphery of the thrust dynamic pressure bearing 13 portion and the oil retained at the lower end portion of the shaft 1 communicate with each other. Thus, it is possible to prevent occurrence of negative pressure at the lower end portion of the shaft 1. Moreover, by facilitating circulation of the oil, it is possible to make air bubbles less liable to gather into one portion at the time of their occurrence When the shaft 1 is rotated with respect to the sleeve 2, oil retained in the radial minute gap generates dynamic pressure between an outer peripheral face of the shaft 1 and an inner peripheral face of the sleeve 2 and radial load supporting pressure is generated. Thus, a radial dynamic pressure bearing 12 is formed. Likewise, when the shaft 1 is rotated with respect to the sleeve 2, oil retained in the axial minute gap generates dynamic pressure between the upper end face of the bearing housing 4 and a lower face of the top portion 3b and thrust (axial) load supporting pressure is generated. Thus, a thrust dynamic pressure bearing 13 is formed.

A diameter of the upper end face 4a, where the thrust dynamic pressure bearing 13 is formed, of the bearing housing 4 is set to be greater than an axial length of the outer peripheral face, where the radial dynamic pressure bearing 12 is formed, of the shaft 1. As a result, the whole dynamic pressure bearing 100 can be made thin while obtaining proper load supporting pressure and it is possible to miniaturize the spindle motor 10 having the dynamic pressure bearing 100.

(1-3) Thrust Dynamic Pressure Generating Grooves

Figure 2:
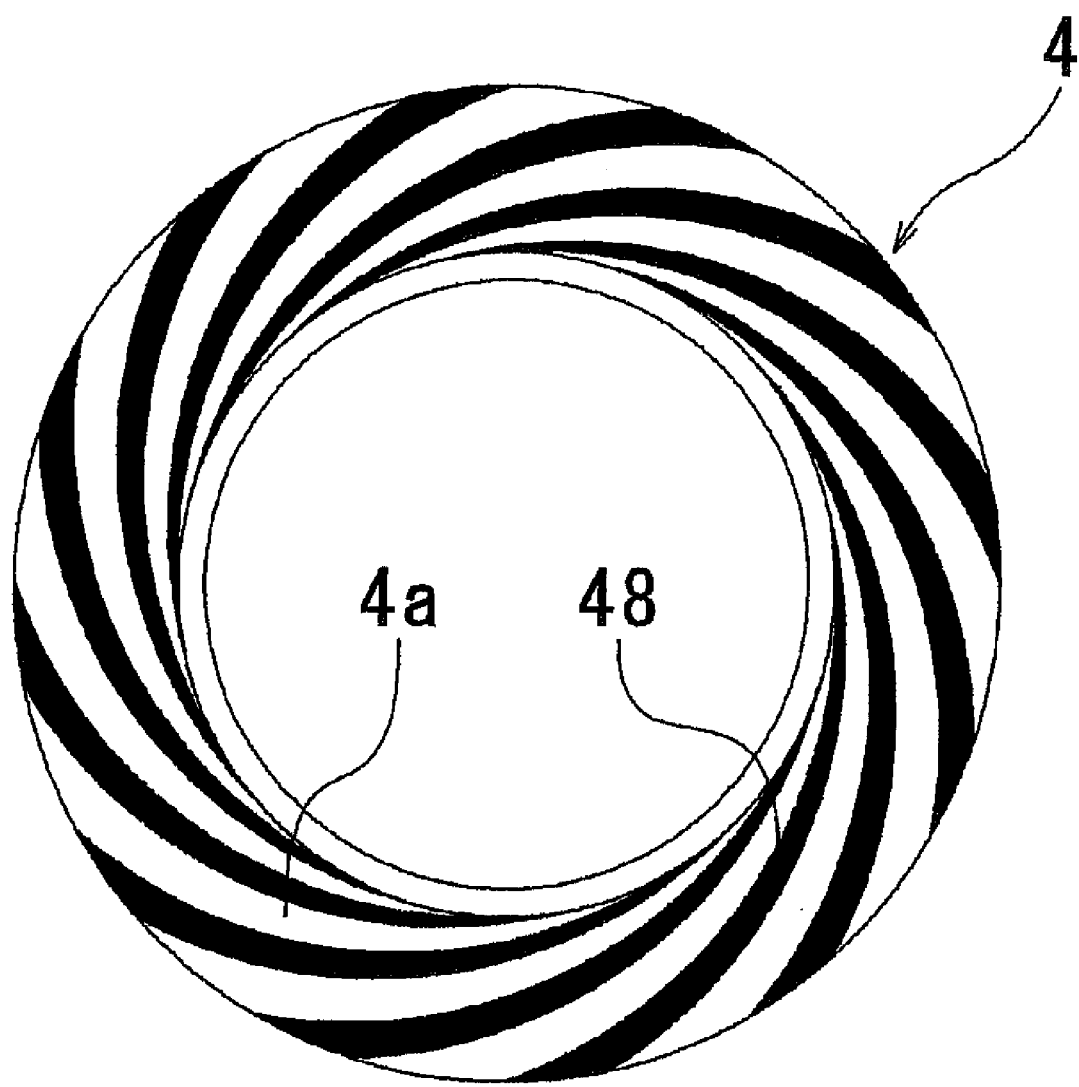
FIG. 2 is a plan view of an upper end face of a bearing housing in which the thrust dynamic pressure bearing in the first embodiment is formed.

FIG. 2 is a plan view of the bearing housing 4 viewed from above. On the upper end face 4a of the bearing housing 4, thrust dynamic pressure generating grooves 48 for increasing thrust load supporting pressure are formed. When pressure within the bearing housing 4 becomes negative pressure with respect to atmospheric pressure, air bubbles may be generated in the dynamic pressure bearing 100, and shaft support by the dynamic pressure bearing 10 may become unstable in some cases. Therefore, in order to constantly make the pressure within the bearing housing 4 higher than atmospheric pressure, the thrust dynamic pressure grooves 48 formed on the upper end face 4a of the bearing housing 4 are inward spiral grooves with respect to a rotating direction so as to send oil inside during rotation. These grooves may be inwardly unbalanced herringbone grooves. The thrust dynamic pressure bearing 13 for pushing oil into the dynamic pressure bearing 100 in this manner is referred to as a pump-in thrust dynamic pressure bearing.

(1-4) Radial Dynamic Pressure Grooves and Flow of Dynamic Pressure Generating Fluid Referring again to FIG. 1, the inner peripheral face of the sleeve 2, radial dynamic pressure generating grooves are formed to increase the radial load supporting pressure. The radial dynamic pressure generating grooves are formed by circumferentially arranging a plurality of recessed portions along the circumferential direction of the inner peripheral face 2a of the sleeve 2, the recessed portions being recessed in the radial direction. Shapes of the recessed portions are preferably configured like the recessed portions 41 discussed next in connection with the embodiments of FIGS. 3 through 6.

In all of FIGS. 3 to 6, the radial dynamic pressure generating grooves are exaggerated. A depth of the actual dynamic pressure generating groove is as shallow as several to several tens of micrometers with respect to a sleeve inside diameter of several millimeters and is difficult to illustrate. For this reason, the depth of each the radial dynamic pressure generating groove is exaggerated as compared with the real one. In each of graphs on lower parts of FIGS. 3 to 6, a vertical axis represents pressure P generated by the dynamic pressure grooves and a horizontal axis is the z-axis parallel to the shaft.

Figure 3:
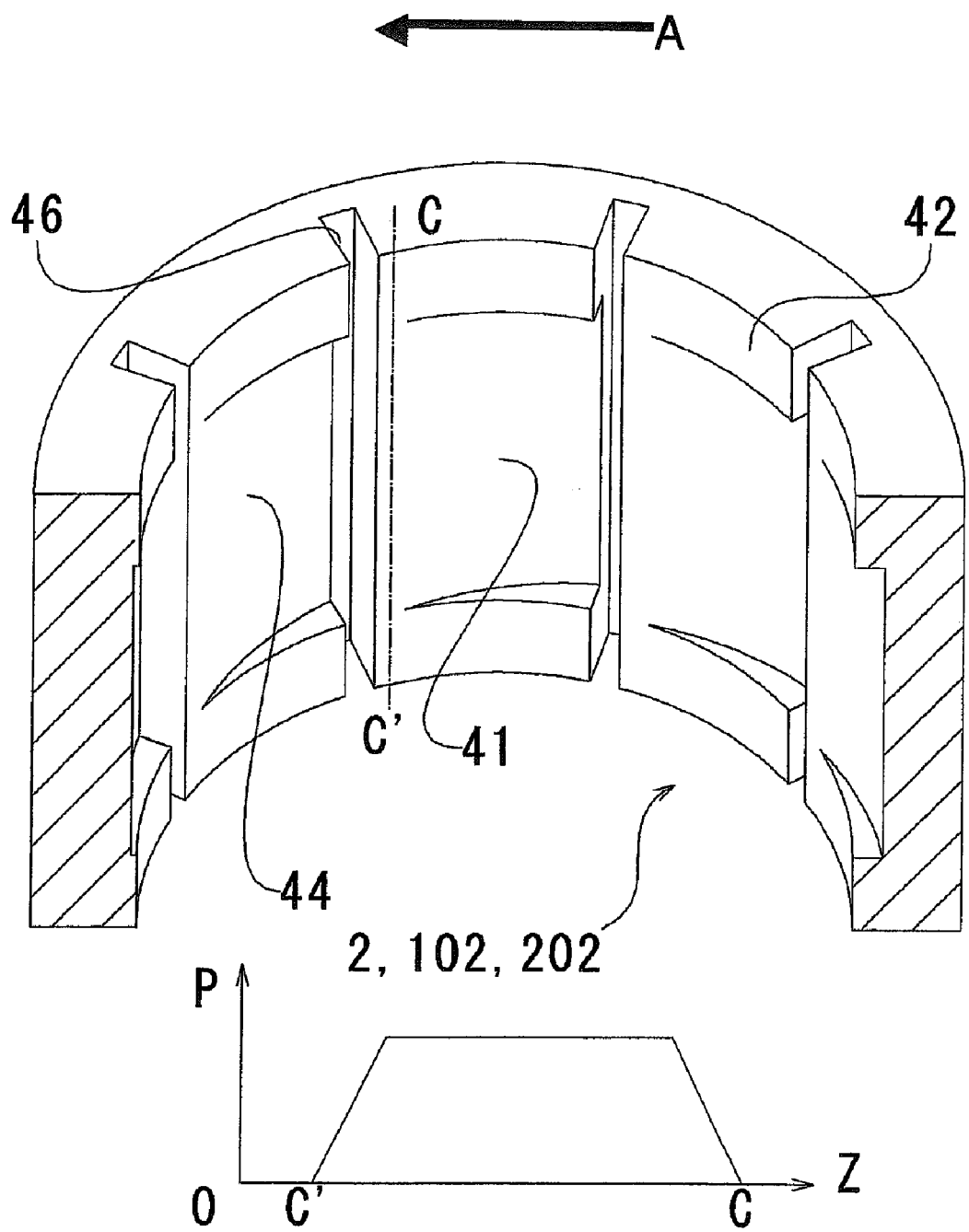
FIG. 3 is a partial perspective view showing a shape of a first recessed portion and a graph of pressure distribution.

FIG. 3 is a cutaway perspective view of the inner peripheral face of the sleeve 2 and showing the shape of the first recessed portions 41 and axial grooves 46, and the graph showing pressure distribution of dynamic pressure generated on a C-C' section. When the sleeve 2 is at rest, if the shaft 1 rotates in an A direction, the oil is pulled by the outer peripheral face 1a of the shaft 1 and starts to flow in the A direction. On an upstream side of the flow of oil, the recessed portion 41 is the deepest and the radial minute gap is wider. As a result, dynamic pressure during rotation is low. From the upstream side toward the downstream side of the flow of oil, the depth of the recessed portions 41 is reduced and the width of the radial minute gap is also reduced. Thus, the dynamic pressure is increased according to speed of rotation and a force acts in such a direction as to move the outer peripheral face 1 a of the shaft 1 away from the inner peripheral face 2a of the sleeve 2. By arranging the plurality of recessed portions 41 on the inner peripheral face 2a of the sleeve 2, the shaft 1 is supported in the radial direction with respect to the sleeve 2. In order to facilitate the workings, banks 42 are formed on axial opposite ends of the recessed portion 41 to thereby prevent the oil pressure of which has been increased on the tapered face 44 from flowing out from axial upper and lower sides.

As shown in the graph in FIG. 3, pressure which is uniform in the axial direction is generated by the dynamic pressure grooves and a high shaft supporting force can be obtained in a wide range. As a result, high resistance is exerted to external force for bringing down the shaft.

The axial groove 46 passing through in the axial direction is formed on the oil upstream side of the recessed portions 41 and the oil pushed out of the radial dynamic pressure bearing 12 is supplied into the radial dynamic pressure bearing 12. Thus, it is possible to prevent occurrence of so-called negative pressure in which pressure of the oil becomes lower than atmospheric pressure at a portion of the radial dynamic pressure bearing with the lowest pressure.

Figure 4:
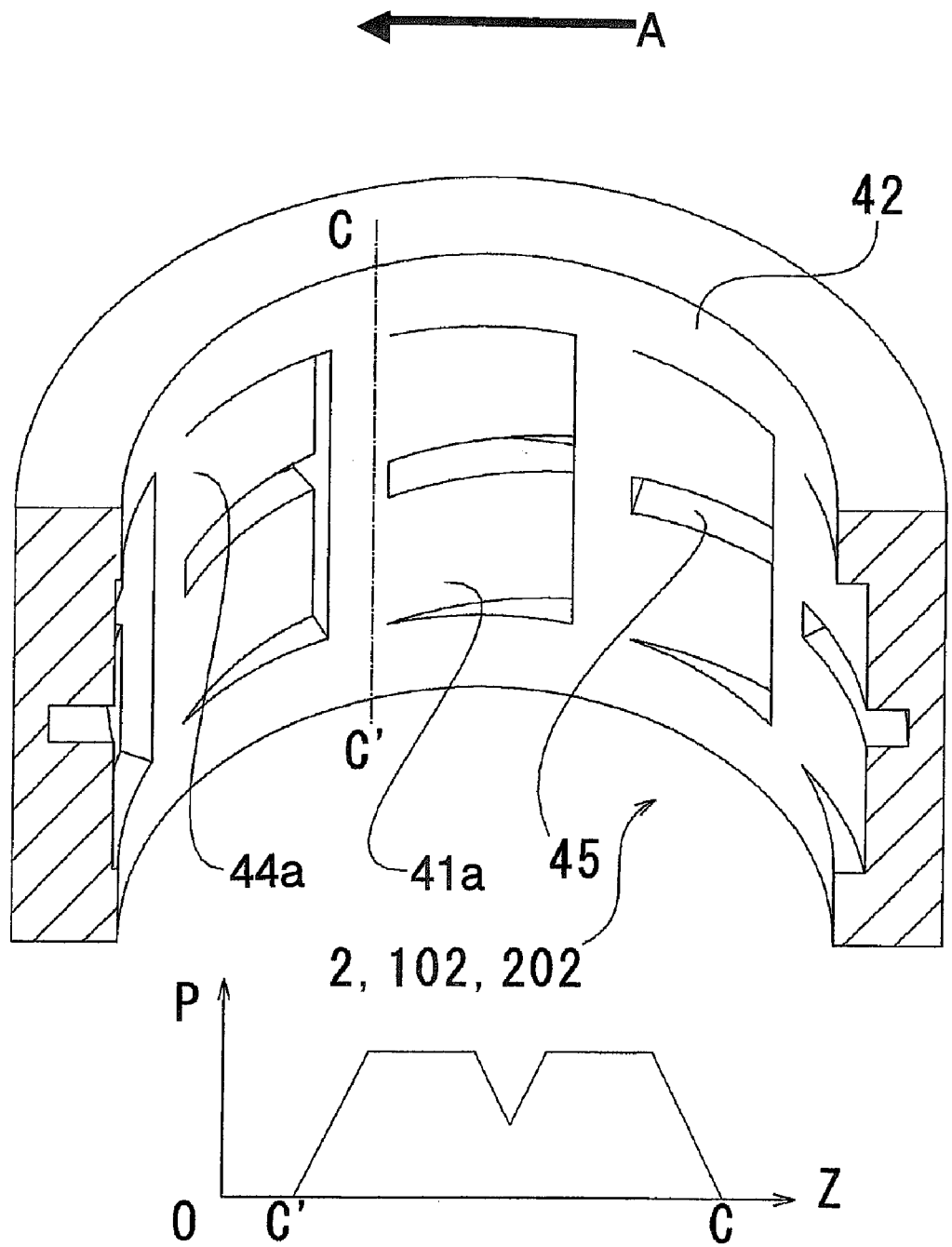
FIG. 4 is a partial perspective view showing a shape of a second recessed portion and a graph of pressure distribution.

FIG. 4 is a cutaway perspective view of the inner peripheral face 2a of the sleeve 2 and showing the shape of the second recessed portions 41a and the graph showing pressure distribution on a C-C' section. When the sleeve 2 is at rest, if the shaft 1 starts to rotate in an A direction, the oil is pulled by the outer peripheral face 1a of the shaft 1 and starts to flow in the A direction. Though the recessed portion 41a has substantially the same shape as the recessed portion 41 shown in FIG. 3, a deep groove 45 is formed along the circumferential direction substantially at the axial center of the recessed portion 41a. During rotation, oil flows into the deep groove 45 from the shallower portion of the recessed portion 41a. With this deep groove 45, generation of the dynamic pressure is suppressed at the substantially central portion in the axial direction of the radial dynamic pressure bearing 12 and radial load support is virtually carried out by two portions, i.e., the upper half and the lower half of the recessed portion 41a. In order to facilitate the workings, banks 42 are formed on axial opposite ends of the recessed portion 41a to thereby prevent the oil pressure of which has been increased on a tapered face 44a from flowing out from axial upper and lower sides.

As shown in the graph in FIG. 4, dynamic pressure is increased on axial upper and lower sides by this dynamic pressure generating grooves and dynamic pressure is not increased so much near the axial center where the deep grooves 45 are formed. As a result, the shaft is supported with respect to the sleeve virtually on two points, the conventional shaft support is possible in spite of a short axial length, and a loss of energy by the bearing can be reduced as compared with a case in which dynamic pressure is increased in a wide range in the axial direction.

Figure 5:
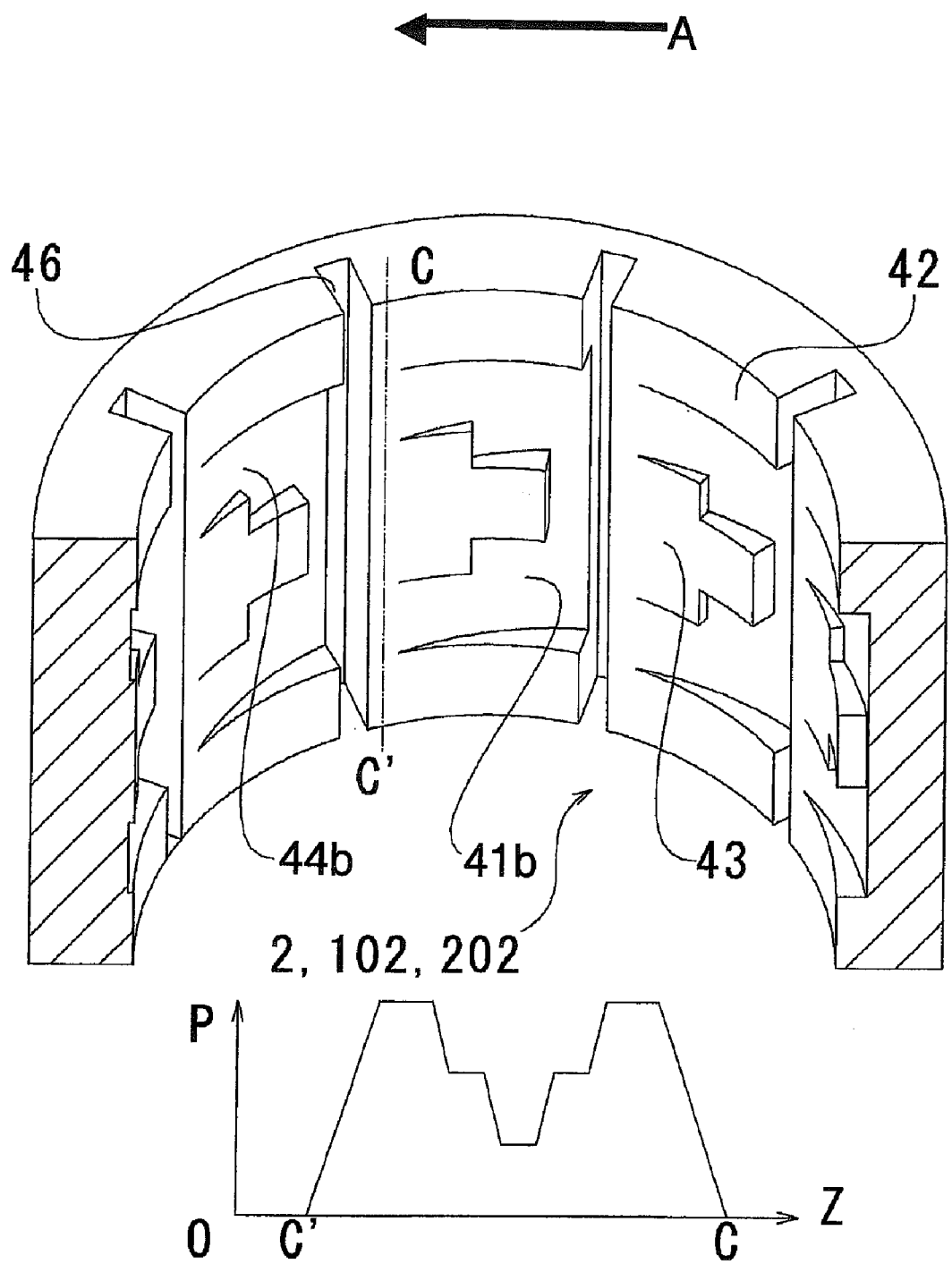
FIG. 5 is a partial perspective view showing a shape of a third recessed portion and a graph of pressure distribution.

FIG. 5 is a cutaway perspective view of the inner peripheral face 2a of the sleeve 2 and showing the shape of the third recessed portions 41b and the graph showing pressure distribution on a C-C' section. When the sleeve 2 is at rest, if the shaft 1 starts to rotate in an A direction, the oil is pulled by the outer peripheral face 1a of the shaft 1 and starts to flow in the A direction. Though the recessed portion 41b has substantially the same shape as the recessed portion 41 shown in FIG. 3, a hill 43 is formed at a circumferential end portion on a shallower side on a tapered face 44b of the recessed portion 41b. The hill 43 forms the same peripheral face as the inner peripheral face 2a of the sleeve 2 where the recessed portion 41b is not formed. On the upstream side of the flow of oil, the hill 43 is stepped and projects from the recessed portion 41b. On the other hand, on the downstream side of the flow of oil, the hill 43 is contiguous with a shallower portion of the recessed portion 41b. This hill 43 functions as a barrier during rotation, oil is pushed out to axial opposite end sides of the recessed portion 41b, and dynamic pressure is increased on each of upper and lower sides of the recessed portion 41b. In order to facilitate the workings, banks 42 are formed on axial opposite ends of the recessed portion 41b to thereby prevent the oil pressure of which has been increased on a tapered face 44b from flowing out from the axial upper and lower sides.

As shown in the graph in FIG. 5, dynamic pressure is ratcheted up from the axial center to the axial opposite end sides by the dynamic pressure generating grooves, pressure is increased in the vicinities of the axial opposite ends of the recessed portion 41b as compared with the cases of the dynamic pressure generating grooves shown in FIGS. 3 and 4, and the shaft is supported more stably.

An axial groove 46 passing through in the axial direction is formed on the upstream side of oil 14 of the recessed portion 41b and the oil pushed out of the radial dynamic pressure bearing 12 is supplied into the radial dynamic pressure bearing 12.

Figure 6:
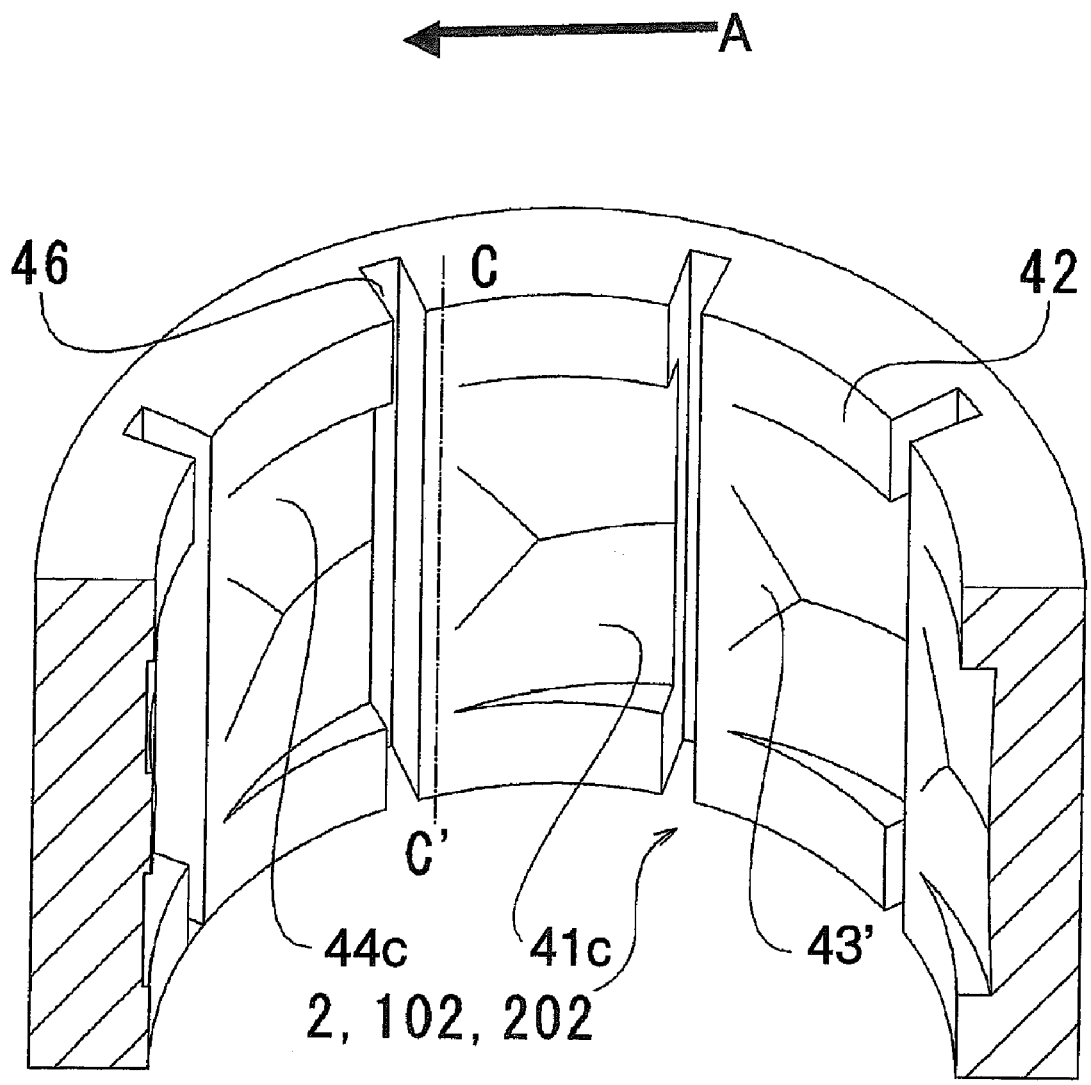
FIG. 6 is a partial perspective view showing a shape of a fourth recessed portion and a graph of pressure distribution.
Figure 6:
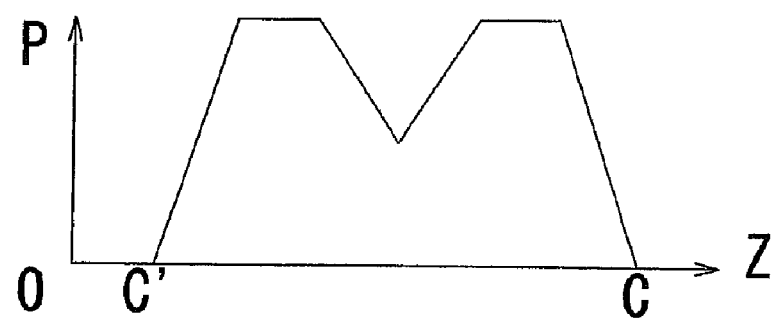

FIG. 6 is a cutaway perspective view of the inner peripheral face 2a of the sleeve 2 and showing the shape of the fourth recessed portions 41c and the graph showing pressure distribution on a C-C' section. When the sleeve 2 is at rest, if the shaft 1 starts to rotate in an A direction, the oil is pulled by the outer peripheral face 1a of the shaft 1 and starts to flow in the A direction. Though the recessed portion 41c has substantially the same shape as the recessed portion 41 shown in FIG. 3, a hill 43' is formed at a circumferential end portion on a shallower side on a tapered face 44c of the recessed portion 41c. The hill 43' is substantially in a shape of an isosceles triangle when viewed from a face parallel to a circumferential face and the two equal sides in length are contiguous with the tapered face 44c. As a result, the oil is smoothly pushed out toward axial opposite ends of the recessed portion 41c, load supporting pressure is generated on each of upper and lower ends of the recessed portion 41c, and the radial dynamic pressure bearing 12 is formed. In order to facilitate the workings, banks 42 are formed on the axial opposite ends of the recessed portion 41c to thereby prevent the oil pressure of which has been increased on a tapered face 44c from flowing out from the axial upper and lower sides.

As shown in the graph in FIG. 6, dynamic pressure is seamlessly increased from the axial center to the axial opposite end sides by the dynamic pressure generating grooves, pressure is increased in the vicinities of the axial upper and lower ends of the recessed portion 41c as compared with the cases of the dynamic pressure generating grooves shown in FIGS. 3 and 4, and the shaft is supported more stably.

By forming the plane shape of the hill not into the isosceles triangle but into a scalene triangle, it is possible to easily change the upper and lower respective load supporting pressures of the radial dynamic pressure. In this manner, it is easy to adapt design to the center of gravity of a rotating body, and stable rotation can be achieved.

An axial groove 46 passing through in the axial direction is formed on the upstream side of oil of the recessed portion 41c and the oil pushed out of the radial dynamic pressure bearing 12 is supplied into the radial dynamic pressure bearing 12.

In addition to these groove shapes, a deep groove 45 may be formed throughout a circumference. In this manner, oil necessary for load support can be distributed throughout the circumference.

In these radial dynamic pressure generating recessed portions 41, 41a, 41b, and 41c, the hills 43 and 43' formed at the axial opposite ends of the recessed portions and the pump-in thrust dynamic pressure bearing described in (1-3) prevent radial dynamic pressure from escaping to the axial opposite end sides. As a result, it is possible to obtain the radial dynamic pressure bearing 12 having sufficient stiffness in spite of the short axial length.

The radial dynamic pressure grooves may be formed on the outer peripheral face of the shaft. They may also be formed on both the shaft and the sleeve. It is preferable that the axial minute gap is narrowed inside the portion of the thrust dynamic pressure bearing 13 where the thrust dynamic pressure grooves 48 are formed, because the radial dynamic pressure can be increased more.

Second Embodiment

Figure 7:
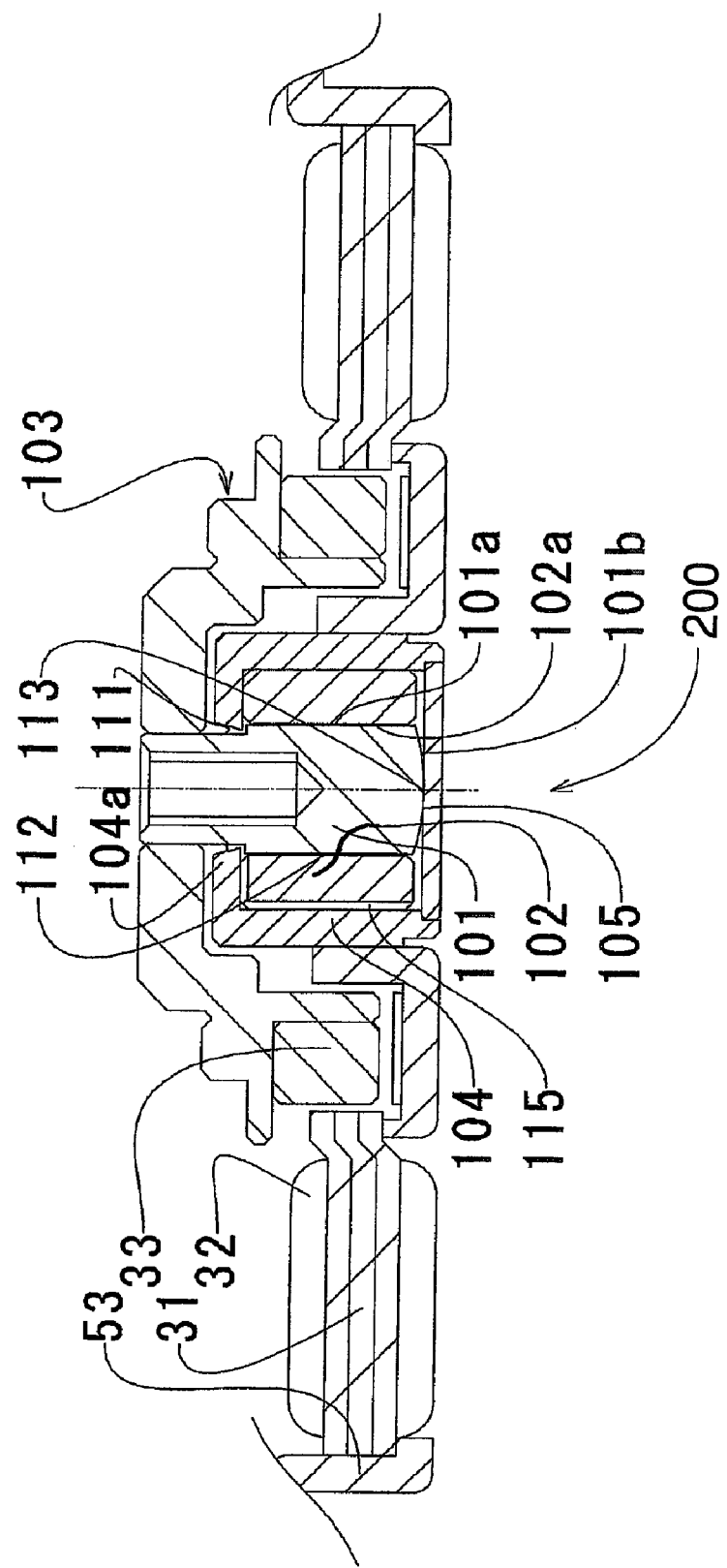
FIG. 7 is a sectional view of a dynamic pressure bearing in a second embodiment.

FIG. 7 is a sectional view of a dynamic pressure bearing 200 of a spindle motor 20 according to the second embodiment in which the present invention is carried out.

(2-1) Structure

The dynamic pressure bearing 200 of the present embodiment includes, like the first embodiment, a substantially columnar shaft 101, a substantially cylindrical sleeve 102, a bearing housing 104 having a cylindrical portion positioned radially outside the sleeve 102, and a rotor hub 103 having a top portion radially extending from an upper end portion of the shaft 101. An upper end portion of the cylindrical portion of the bearing housing 104 extends radially inward so that an upper end face of the sleeve 102 comes in contact with the upper end portion and the upper end portion is formed with an annular portion 104a having a smaller inside diameter than an outer peripheral face 101a of the shaft 101. The shaft 101 has a circumferential recessed portion 101c having a smaller diameter than an inner peripheral face of the annular portion 104a and the innermost end portion of the annular portion 104a is positioned at the circumferential recessed portion to thereby function as a fusion in the axial direction. A thrust plate 105 is attached to a lower opening portion of the cylindrical portion of the bearing housing 104 to close the opening portion. For this thrust plate 105, resin, Teflon (registered trademark), surface processed metal, and ceramics which have a small coefficient of friction in sliding on metal are used.

(2-2) Structure of Dynamic Pressure Bearing

An outer peripheral face 101a of the shaft 101 and an inner peripheral face 102a of the sleeve 102 face each other in a radial direction through a minute gap. In the radial minute gap, oil having lubricity is retained. The oil is also retained seamlessly between a lower end portion of the shaft 101 and the thrust plate 105. Thus, oil is filled in the bearing housing 104 closed with the thrust plate 105 without voids.

An inner peripheral face of the annular portion of the bearing housing 104 has a slope which is inclined so that a gap between the inner peripheral face and an outer peripheral face of the circumferential recessed portion of the shaft 101 increases upward and an interface between oil and outside air is formed on the slope.

When the shaft 101 is rotated with respect to the sleeve 102, oil retained in the radial minute gap generates dynamic pressure between an outer peripheral face of the shaft 101 and an inner peripheral face of the sleeve 102 and radial load supporting pressure is generated. Thus, a radial dynamic pressure bearing 112 is formed. A lower end portion 101b of the shaft 101 is formed into a spherical shape and comes in point contact with the thrust plate 105 attached to a lower end portion of the bearing housing 104 and slides. In this manner, an axial load is supported and a thrust bearing 113 is formed.

(2-3) Radial Dynamic Pressure Bearing Grooves

Radial dynamic pressure grooves of the present embodiment have the same shape as those of the first embodiment.

A reference numeral 115 designates a connecting hole formed between the bearing housing 104 and the sleeve 102.

Third Embodiment

Figure 8:
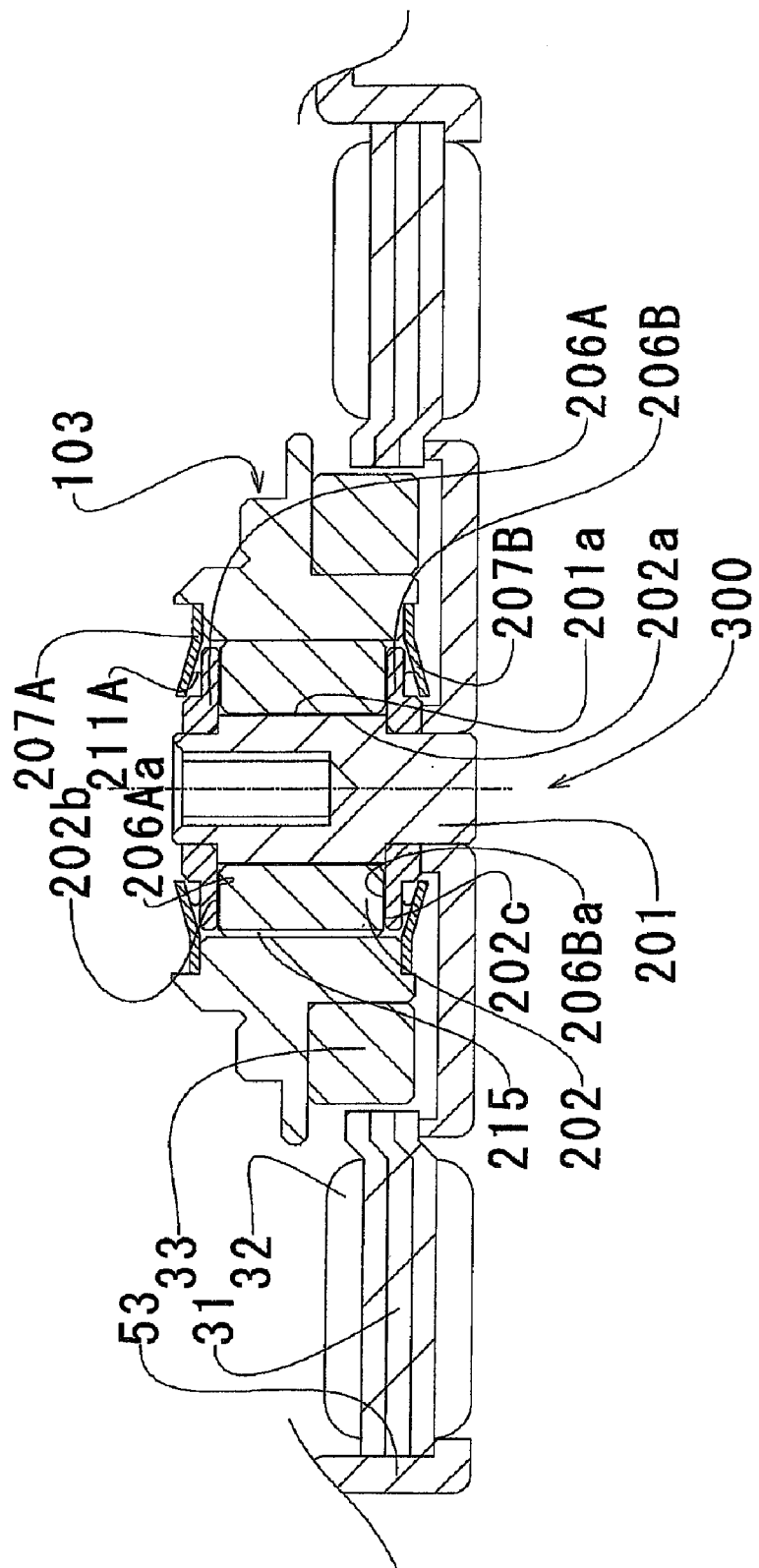
FIG. 8 is a sectional view of a dynamic pressure bearing in third embodiment.

FIG. 8 is a sectional view of a dynamic pressure bearing 300 of a spindle motor 30 according to the third embodiment in which the present invention is carried out.

(3-1) Structure

The dynamic pressure bearing 300 of the present embodiment is formed of a substantially columnar shaft 201, a substantially cylindrical sleeve 202, a first thrust bushing 206A fixed to the shaft 201 and having a thrust plane 206A*a* opposed to an upper end face 202b of the sleeve 202, a second thrust bushing 206B fixed to the shaft 201 and having a thrust plane 206B*a* opposed to a lower end face 202c of the sleeve 202, a rotor hub 203 fitted from radially outside with the sleeve 202, a first sealing member 207A attached to the rotor hub 203 and positioned on an axial upper side of the first thrust bushing 206A, and a second sealing member 207B attached to the rotor hub 203 and positioned on an axial lower side of the second thrust bushing 206B.

(3-2) Structure of Dynamic Pressure Bearing

An outer peripheral face of the shaft 201 and an inner peripheral face of the sleeve 202 face each other in a radial direction through a minute gap. In the radial minute gap, oil having lubricity is retained.

An upper end face of the sleeve 202 and a lower face of a first thrust bushing 206A face each other through a first axial minute gap. A lower end face of the sleeve 202 and an upper face of the second thrust bushing 206B face each other through a second axial minute gap. In the first axial minute gap and the second axial minute gap, the same oil as that retained in the radial minute gap is provided while communicating with the radial minute gap. Thus, oil is filled successively from the first axial minute gap through the radial minute gap to the second axial minute gap.

A first tapered portion with a width increasing inward in the radial direction is formed between an upper face of the first thrust bushing 206A and a lower face of the first sealing member 207A and an interface between oil and outside air is formed in the first tapered portion. A second tapered portion with a width increasing inward in the radial direction is formed between a lower face of the second thrust bushing 206B and an upper face of the second sealing member 207B and an interface between oil and outside air is formed in the second tapered portion.

When the shaft 201 is relatively rotated with respect to the sleeve 202, oil retained in the radial minute gap generates dynamic pressure between an outer peripheral face 201*a* of the shaft 201 and an inner peripheral face 202*a* of the sleeve 202 and radial load supporting pressure is generated. Thus, a radial dynamic pressure bearing is formed. Likewise, when the shaft 201 is relatively rotated with respect to the sleeve 202, oil retained in the first axial minute gap generates dynamic pressure between the upper end face of the sleeve 202 and the lower face of the first thrust bushing 206A and thrust load supporting pressure for pushing the sleeve 202 downward with respect to the shaft 201 is generated. Furthermore, oil retained in the second axial minute gap generates dynamic pressure between the lower end face of the sleeve 202 and the upper face of the second thrust bushing 206B and thrust load supporting pressure for supporting the sleeve 202 upward with respect to the shaft 201 is generated. These two thrust load supporting pressures form a thrust dynamic pressure bearing.

(3-3) Thrust Dynamic Pressure Generating Grooves

Figure 11:
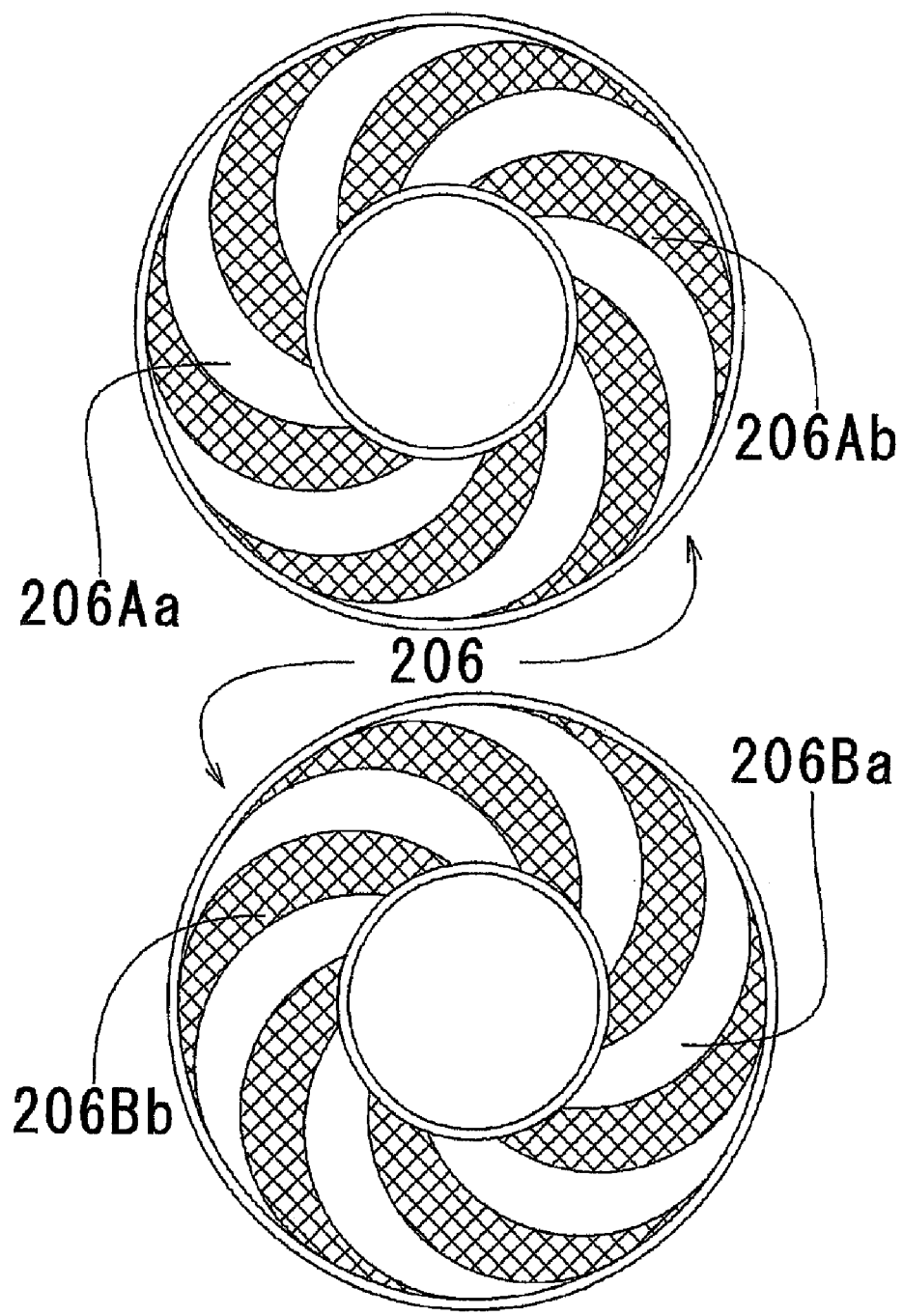
FIG. 11 is a plan view of upper and lower end faces of a sleeve in which the thrust dynamic pressure bearing in the third embodiment is formed viewed from above and below.

In the present embodiment, both of the two thrust dynamic pressure bearings are pump-in thrust dynamic pressure bearings like that described in the first embodiment. Their dynamic pressure generating grooves are formed on faces of the first and second thrust bushings 206A and 206B respectively opposed to the sleeve 202. FIG. 11 is a plan view of the dynamic pressure generating grooves 206A*b* and 206B*b* respectively viewed from above and below.

The dynamic pressure generating grooves may respectively be formed on upper and lower end faces of the sleeve 202. Especially if the sleeve 202 is formed of a sintered porous metal, the thrust dynamic pressure generating grooves can easily be formed by pressing in forming and sizing.

In the present embodiment, radially inner portions of the portions of the first and second axial minute gaps where the dynamic pressure generating grooves are formed preferably have axial gaps narrowed in the circumferential direction. To put it more concretely, ones or both of faces of the first and second thrust bushings 206A and 206B opposed to the sleeve 202 and opposite end faces of the sleeve 202 are formed with axial hills 302b extending around the shaft. If the axial hill portions 302b are formed on the sleeve 202, a shape of the sleeve 202 is just like a shape of a sleeve 302 in FIG. 10. The axial hill portions 302b may not be seamless in the circumferential direction but may be disposed in spaced positions corresponding to portions where the radial dynamic pressure is increased.

If the pump-in thrust dynamic pressure bearings or the axial hill portions 302b are formed, it is possible to prevent oil pressure of which has been increased by the radial dynamic pressure bearing in the radial minute gap from flowing into the axial minute gap. As a result, it is possible to further increase the load supporting pressure by the radial dynamic pressure bearing.

Moreover, the thrust dynamic pressure bearings generate dynamic pressures both upward and downward, which form drag against the force acting in such a direction as to incline the shaft.

(3-4) Radial Dynamic Pressure Grooves

Radial dynamic pressure generating grooves in the present embodiment are similar to those in the first embodiment.

A reference numeral 215 designates a connecting hole formed between the rotor hub 203 and the sleeve 202.

In the present embodiment, the thrust dynamic pressure bearings are pump-in thrust dynamic pressure bearings. Therefore, oil does not flow out in the axial direction from the radial dynamic pressure bearing portion without banks 42 formed on the sleeve inner peripheral face forming the radial dynamic pressure bearing and the banks 42 may be omitted.

Fourth Embodiment

Figure 9:
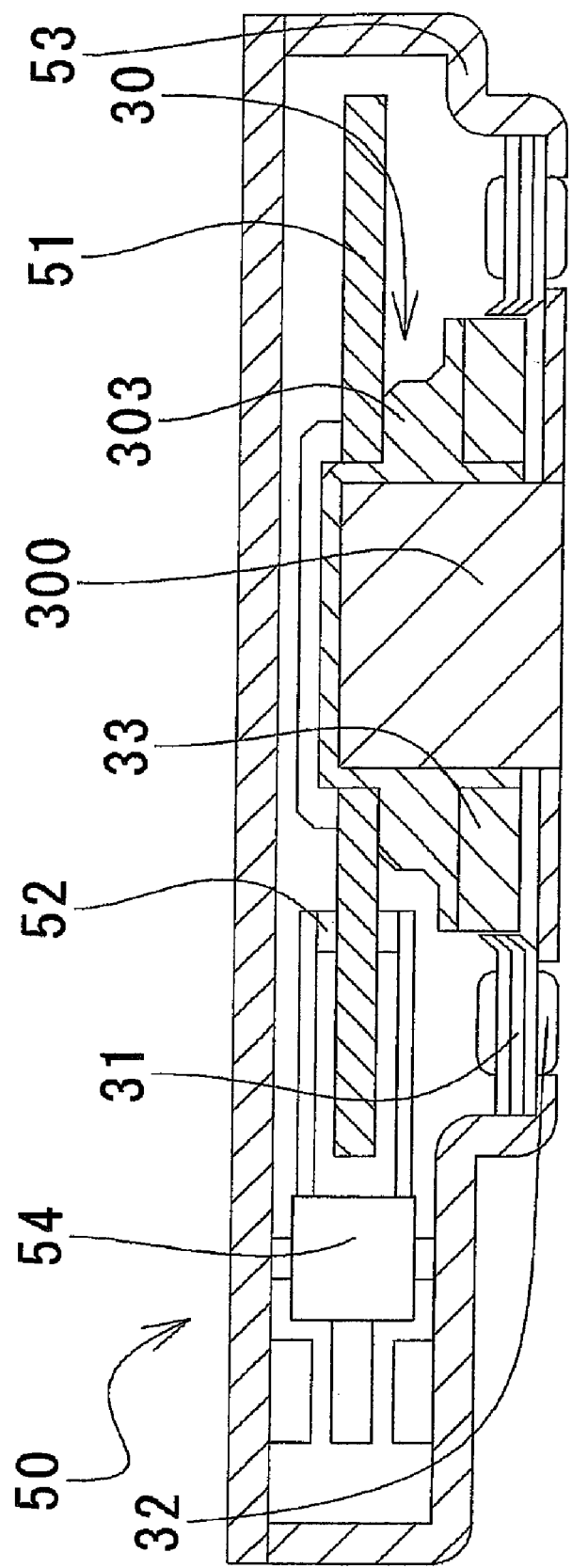
FIG. 9 is a sectional view of a recording disk drive device in a fourth embodiment.

FIG. 9 is a sectional view of a spindle motor 30 and a recording disk drive device 50 in which the present invention is carried out.

(4-1) Structure

This recording disk drive device 50 includes a recording disk 51, a spindle motor 30 for rotating the recording disk 51, a head 52 for making access to information on the recording disk 51, and a housing 53 for housing all of them.

(4-2) Spindle Motor

The spindle motor 30 has a dynamic pressure bearing 300 described in the first to third embodiments. The spindle motor 30 uses a portion of the housing 53 as its base plate and a stator 31 and a circuit board (not shown) are fixed onto the base plate. On the other hand, a rotor magnet 33 fixed to a rotor hub 303 is radially opposed to the stator 31 and is supported by the dynamic pressure bearing 300 to be rotatable with respect to the base member and the stator 31. The stator 31 has a plurality of coils 32 and energization of these coils 32 is controlled by a control circuit.

(4-3) Operation

The recording disk 51 is placed on the rotor hub 303 of the spindle motor 30 and is rotated with the rotor hub 303. When the coils 32 of the stator 31 are energized by the control circuit, the spindle motor 30 starts to rotate. The dynamic pressure bearing 300 supports a rotating side and a non-rotating side while keeping them from contact with each other to thereby suppress vibration of the spindle motor 30. In this manner, errors in writing on the recording disk 51 and the like can be suppressed, reliability is enhanced, and a speedup can be achieved. Moreover, the recording disk drive device 50 can be made quiet and grating noise is less liable to be caused by the device 50 when it is mounted in portable equipment, sound equipment, and the like.

With the dynamic pressure bearing 300 of the invention, stable and high shaft supporting pressure can be obtained and it is possible to stably support the shaft even if a shock is applied from outside. Therefore, the bearing is particularly advantageous when used in in-car equipment, the portable equipment, and the like which require stability especially against vibrations and shocks.

Although the embodiments of the present invention have been described above, the invention is not limited by these embodiments and various changes can be made without departing from a spirit of the invention.

Figure 10:
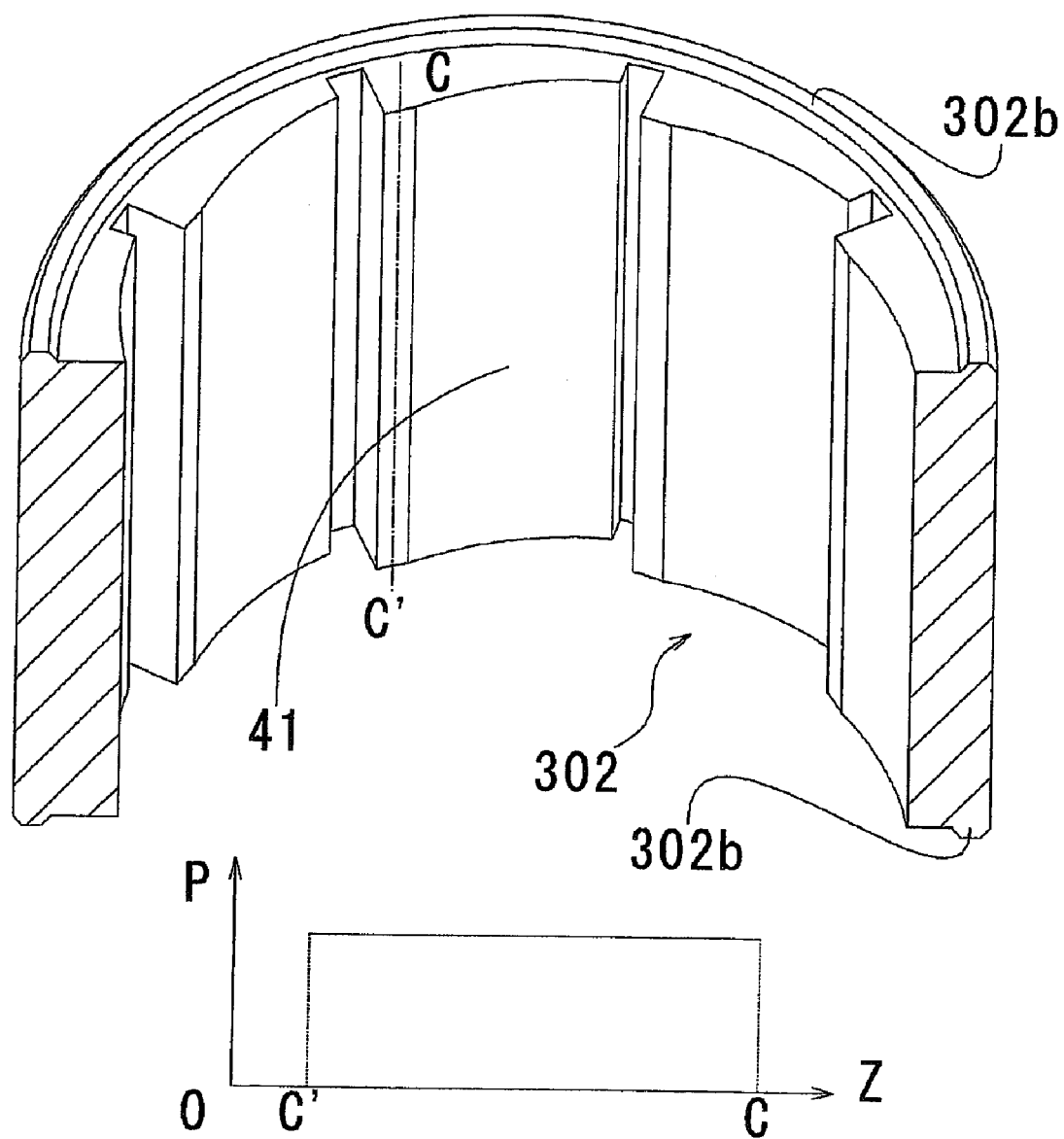
FIG. 10 is a partial perspective view showing a shape of a sleeve and a graph of pressure distribution.

For example, FIG. 10 is a cutaway perspective view of a sleeve 302 used for another embodiment of the dynamic pressure bearing of the invention and a graph showing pressure distribution. This sleeve can be used instead of the sleeve in the first embodiment or the third embodiment. This sleeve 302 is formed with (an) axial hill portion(s) 302b on its upper end face and/or lower end face. The axial hill portion(s) is(are) formed seamlessly in the circumferential direction. With this axial hill portion 302b, a gap between the upper end face or the lower end face of the sleeve 302 and an opposed face is further narrowed. For example, size of the gap is 15 μm or smaller. Even if the banks 42 are not formed on an upper side or a lower side of an inner peripheral face of the sleeve 302, the axial hill portion(s) 302b can prevent oil dynamic pressure of which has been increased from flowing out of the bearing, i.e., flowing radially outward.

If the lower side of the dynamic pressure bearing is closed as shown in the first and second embodiments and oil is filled in the bearing housing, the banks 42 on the lower side of the sleeve can be omitted. This is because oil dynamic pressure of which has been increased can not flow downward more than a certain distance and dynamic pressure is increased consequently even without the banks 42.

The present invention may be a dynamic pressure bearing in which a sleeve and a bearing housing are formed integrally. It is needless to say that the invention can be applied to dynamic pressure bearings in various shapes.

In the embodiments, a person skilled in the art can properly select the most suitable design where size, material, and the like are not especially specified.

What is claimed is:

1. A dynamic pressure bearing device comprising:
   a substantially columnar shaft centered on and extending along a central axis;
   a sleeve in which the shaft is received, the sleeve being coaxial with the shaft such that an inner surface of the sleeve opposes, in a radial direction perpendicular to the center axis, an outer surface of the shaft; and
   fluid retained between the sleeve and the shaft in the radial direction,
   wherein the shaft is rotatable relative to the sleeve in a circumferential direction of the sleeve with the fluid interposed therebetween,
   the sleeve has a plurality of first grooves in the inner surface thereof, the first grooves having opposite ends in the axial direction of the sleeve, and each of the first grooves having opposite sides in the circumferential direction of the inner surface of the sleeve,
   the sleeve also has a respective bank disposed adjacent each of at least one of the ends of the first grooves in the axial direction of the sleeve, each said bank being raised relative to the first grooves inwardly in the radial direction so as to prevent fluid from escaping axially from the first grooves, the first grooves being arrayed circumferentially along the inner surface of the sleeve, and
   the depth of each of the first grooves decreases in the circumferential direction in which the shaft rotates relative to the sleeve, whereby the pressure of fluid retained in the first grooves increases when the shaft rotates relative to the sleeve in said circumferential direction.

2. A dynamic pressure bearing device according to claim 1, wherein the radial distance between the sleeve and the central axis is smallest at the locations of a respective one of the opposite sides of the first grooves in the circumferential direction of the inner surface of the sleeve, and said distance is the same as the radial distance between the sleeve and the central axis at the locations of each said bank axially adjacent said respective one of the opposite sides of the first grooves.

3. A dynamic pressure bearing device according to claim 2, wherein the sleeve also has axially extending grooves in the inner surface thereof adjacent the opposite sides of the first grooves, and the radial distance between the central axis and the sleeve is largest at the locations of the axially extending grooves.

4. A dynamic pressure bearing device according to claim 1, further comprising:
   a thrust flange extending radially outward from a portion of the shaft such that a surface thereof is axially opposed to the sleeve, and
   wherein the sleeve has an end face axially opposed to the surface of the thrust flange,
   the fluid is also retained between the end face of the sleeve and the surface of the thrust flange, and at least one of the surface of the thrust flange and the end face has a spiral thrust dynamic pressure generating groove therein, whereby the end face of the sleeve, the surface of the thrust flange, and the fluid retained between the end face of the sleeve and the surface of the thrust flange form a pump-in type of thrust dynamic pressure bearing for radially inwardly increasing the pressure of the fluid when the shaft rotates relative to the sleeve in said circumferential direction.

5. A dynamic pressure bearing device according to claim 2, wherein the diameter of the end face of the sleeve is equal to or greater than the axial length of the inner surface of the sleeve.

6. A dynamic pressure bearing device according to claim 1, wherein the sleeve is substantially cylindrical, and further comprising a substantially cup-shaped bearing housing disposed radially outwardly of the sleeve.

7. A dynamic pressure bearing device according to claim 6, wherein the sleeve and the bearing housing are integral with each other.

8. A dynamic pressure bearing device according to claim 1, wherein:
the shaft has a plurality of second grooves in the outer surface thereof, the second grooves having opposite ends in the axial direction of the shaft, and each of the second grooves having opposite sides in the circumferential direction of the outer surface of the shaft,
the shaft also has a respective bank disposed adjacent each of at least one of the ends of the second grooves in the axial direction of the shaft, each said bank being raised relative to the second grooves outwardly in the radial direction so as to prevent fluid from escaping axially from the second grooves, the second grooves being arrayed circumferentially along the outer surface of the shaft, and the second grooves and each said bank of the shaft radially opposing, respectively, the first grooves and each said bank of the sleeve, and
the depth of each of the second grooves increases in a circumferential direction in which the shaft rotates relative to the sleeve.

9. A dynamic pressure bearing device comprising:
a substantially columnar shaft centered on and extending along a central axis;
a sleeve in which the shaft is received, the sleeve being coaxial with the shaft such that an inner surface of the sleeve opposes, in a radial direction perpendicular to the center axis, an outer surface of the shaft; and
fluid retained between the sleeve and the shaft in the radial direction,
wherein the shaft is rotatable relative to the sleeve in a circumferential direction of the sleeve with the fluid interposed therebetween,
the shaft has a plurality of grooves in the outer surface thereof, the grooves having opposite ends in the axial direction of the shaft, and each of the grooves having opposite sides in the circumferential direction of the outer surface of the shaft,
the shaft also has a respective bank disposed adjacent each of at least one of the ends of the grooves in the axial direction of the shaft, each said bank being raised relative to the grooves outwardly in the radial direction so as to prevent fluid from escaping axially from the grooves, the grooves being arrayed circumferentially along the outer surface of the shaft, and
depth of each of the grooves increases in a circumferential direction in which the shaft rotates relative to the sleeve, whereby the pressure of fluid retained in the grooves increases when the shaft rotates relative to the sleeve in said circumferential direction.

10. A dynamic pressure bearing device according to claim 9, wherein the radial distance between the shaft and the central axis is largest at the locations of a respective one of the opposite sides of the grooves in the circumferential direction of the outer surface of the shaft, and said distance is the same as the radial distance between the shaft and the central axis at the locations of each said bank axially adjacent said respective one of the opposite sides of the grooves.

11. A dynamic pressure bearing device according to claim 10, wherein the shaft also has axially extending grooves in the outer surface thereof adjacent the opposite sides of the grooves arrayed in the circumferential direction of the outer surface of the sleeve, and the radial distance between the shaft and the central axis is smallest at the locations of the axially extending grooves.

12. A dynamic pressure bearing device according to claim 9, further comprising:
a thrust flange extending radially outward from a portion of the shaft such that a surface thereof is axially opposed to the sleeve, and
wherein the sleeve has an end face axially opposed to the surface of the thrust flange,
the fluid is also retained between the end face of the sleeve and the surface of the thrust flange, and
at least one of the surface of the thrust flange and the end face has a spiral thrust dynamic pressure generating groove therein,
whereby the end face of the sleeve, the surface of the thrust flange, and the fluid retained between the end face of the sleeve and the surface of the thrust flange form a pump-in type of thrust dynamic pressure bearing for radially inwardly increasing the pressure of the fluid when the shaft rotates relative to the sleeve in said circumferential direction.

13. A dynamic pressure bearing device according to claim 12, wherein the diameter of the end face of the sleeve is equal to or greater than the axial length of the inner surface of the sleeve.

14. A dynamic pressure bearing device according to claim 9, wherein the sleeve is substantially cylindrical, and further comprising a substantially cup-shaped bearing housing disposed radially outwardly of the sleeve.

15. A dynamic pressure bearing device according to claim 14, wherein the sleeve and the bearing housing are integral with each other.

16. A disk drive device comprising:
a spindle motor to which a disk can be mounted, the spindle motor including a stator, a rotor magnet opposed to the stator, a rotor hub retaining the rotor magnet, and a dynamic pressure bearing supporting the rotor hub so as to be rotatable with the rotor magnet relative to the stator about a central axis,
the dynamic pressure bearing comprising a substantially columnar shaft centered on and extending along the central axis, the shaft being integral with the rotor hub,
a sleeve in which the shaft is received, the sleeve being coaxial with the shaft such that an inner surface of the sleeve opposes, in a radial direction perpendicular to the center axis, an outer surface of the shaft, and
fluid retained between the sleeve and the shaft in the radial direction, wherein the shaft is rotatable relative to the sleeve in a circumferential direction of the sleeve with the fluid interposed therebetween, the sleeve has a plurality of first grooves in the inner surface thereof, the first grooves having opposite ends in the axial direction of the sleeve, and each of the first grooves having opposite sides in the circumferential direction of the inner surface of the sleeve, the sleeve also has a respective bank disposed adjacent each of at least one of the ends of the first grooves in the axial direction of the sleeve, each said bank being raised relative to the first grooves inwardly in the radial direction so as to prevent fluid from escaping axially from the first grooves, the first grooves being arrayed circumferentially along the inner surface of the sleeve, and the depth of each of the first grooves decreases in the circumferential direction in which the shaft rotates relative to the sleeve, whereby the pressure of fluid retained in the first grooves increases when the shaft rotates relative to the sleeve in said circumferential direction;

a head operable to read and write data from and onto a disk of the type to be mounted to the spindle motor; and an actuator operable to move the head relative to a surface of the disk when the disk is mounted to the spindle motor.

17. A disk drive device comprising:

a spindle motor to which a disk can be mounted, the spindle motor including a stator, a rotor magnet opposed to the stator, a rotor hub retaining the rotor magnet, and a dynamic pressure bearing supporting the rotor hub so as to be rotatable with the rotor magnet relative to the stator about a central axis, the dynamic pressure bearing comprising a substantially columnar shaft centered on and extending along the central axis, the shaft being integral with the rotor hub, a sleeve in which the shaft is received, the sleeve being coaxial with the shaft such that an inner surface of the sleeve opposes, in a radial direction perpendicular to the center axis, an outer surface of the shaft, and fluid retained between the sleeve and the shaft in the radial direction, wherein the shaft is rotatable relative to the sleeve in a circumferential direction of the sleeve with the fluid interposed therebetween, the shaft has a plurality of grooves in the outer surface thereof, the grooves having opposite ends in the axial direction of the shaft, and each of the grooves having opposite sides in the circumferential direction of the outer surface of the shaft, the shaft also has a respective bank disposed adjacent each of at least one of the ends of the grooves in the axial direction of the shaft, each said bank being raised relative to the grooves outwardly in the radial direction so as to prevent fluid from escaping axially from the grooves, the grooves being arrayed circumferentially along the outer surface of the shaft, and the depth of each of the grooves increases in a circumferential direction in which the shaft rotates relative to the sleeve, whereby the pressure of fluid retained in the grooves increases when the shaft rotates relative to the sleeve in said circumferential direction;

a head operable to read and write data from and onto a disk of the type to be mounted to the spindle motor; and an actuator operable to move the head relative to a surface of the disk when the disk is mounted to the spindle motor.

* * * * *